(12) United States Patent
Yamakawa et al.

(10) Patent No.: US 11,338,394 B2
(45) Date of Patent: May 24, 2022

(54) LASER PROCESSING APPARATUS, LASER PROCESSING METHOD AND THIN PLATE PROCESSED USING THE SAME

(71) Applicant: WIRED CO., LTD., Sanjo (JP)

(72) Inventors: Akio Yamakawa, Sanjo (JP); Naohiko Soma, Sanjo (JP); Mitsuyuki Kaneko, Sanjo (JP)

(73) Assignee: WIRED CO., LTD., Sanjo (JP)

( * ) Notice: Subject to any disclaimer, the term of this patent is extended or adjusted under 35 U.S.C. 154(b) by 156 days.

(21) Appl. No.: 16/631,254

(22) PCT Filed: Aug. 29, 2018

(86) PCT No.: PCT/JP2018/031887
§ 371 (c)(1),
(2) Date: Jan. 15, 2020

(87) PCT Pub. No.: WO2019/044879
PCT Pub. Date: Mar. 7, 2019

(65) Prior Publication Data
US 2020/0215647 A1    Jul. 9, 2020

(30) Foreign Application Priority Data

Sep. 1, 2017  (JP) .............................. JP2017-168581
Dec. 18, 2017  (JP) .............................. JP2017-242085

(51) Int. Cl.
*B23K 26/382* (2014.01)
*B23K 26/08* (2014.01)

(52) U.S. Cl.
CPC ........ *B23K 26/382* (2015.10); *B23K 26/0846* (2013.01)

(58) Field of Classification Search
CPC ............ B23K 26/0838; B23K 26/0846; B23K 26/382

(Continued)

(56) References Cited

U.S. PATENT DOCUMENTS 4,568,815 A    2/1986  Kimbara et al.
5,382,773 A *  1/1995  Kurihara ............ B23K 26/0661
                                         219/121.7

(Continued)

FOREIGN PATENT DOCUMENTS

CN    1460589 A    12/2003
CN    1608829 A     4/2005

(Continued)

OTHER PUBLICATIONS

Korean Office Action dated Feb. 10, 2021, in connection with corresponding KR Application No. 10-2020-7001884 (10 pp., including machine-generated English translation).

(Continued)

*Primary Examiner* — Dana Ross
*Assistant Examiner* — Joseph W Iskra
(74) *Attorney, Agent, or Firm* — Maier & Maier, PLLC

(57) ABSTRACT

A laser processing apparatus and a laser processing method for improving the processing speed and forming uniform and highly accurate through holes when processing for forming fine through holes in a matrix in a long thin plate, and a thin plate having through holes in a matrix formed by such laser processing. A laser processing apparatus includes a cylindrical body having an opening on a circumferential surface around which a thin plate to be processed is wound obliquely, a thin plate transfer for transferring a thin plate wound around the cylindrical body in the longitudinal direction of the thin plate, a motor having a rotation axis arranged coaxially with a central axis of the cylindrical body, a reflecting member fixed to a rotating shaft of the motor, a laser light emitting means for emitting pulsed light. The apparatus continuously opens through holes in the thin plate.

10 Claims, 10 Drawing Sheets

(58) Field of Classification Search
USPC .................................................. 219/121.71
See application file for complete search history.

(56) References Cited

U.S. PATENT DOCUMENTS

| | | | |
|---|---|---|---|
| 6,399,008 | B1 | 6/2002 | Nakazawa et al. |
| 6,423,932 | B1 | 7/2002 | Lawson |
| 7,297,222 | B2 | 11/2007 | Chen |
| 2017/0035618 | A1 | 2/2017 | Piantoni et al. |
| 2017/0189242 | A1* | 7/2017 | Piantoni ............. B23K 26/0846 |
| 2018/0304410 | A1* | 10/2018 | Watanabe .......... B23K 26/0604 |

FOREIGN PATENT DOCUMENTS

| | | |
|---|---|---|
| CN | 101548233 A | 9/2009 |
| CN | 105307838 A | 2/2016 |
| CN | 105706254 A | 6/2016 |
| CN | 106488756 A | 3/2017 |
| CN | 106659593 A | 5/2017 |
| EP | 0 329 438 A1 | 8/1989 |
| JP | S59-42194 A | 3/1984 |
| JP | 59191585 A | 10/1984 |
| JP | H05-228669 A | 9/1993 |
| JP | H05228669 A | 9/1993 |
| JP | H0631473 A | 2/1994 |
| JP | H07-314742 A | 12/1995 |
| JP | 10-217515 A | 8/1998 |
| JP | 2000165017 A | 6/2000 |
| JP | 2000200698 A | 7/2000 |
| JP | 2003334673 A | 11/2003 |
| JP | 2004-209508 A | 7/2004 |
| JP | 2008012916 A | 1/2008 |
| KR | 1020170029411 A | 3/2017 |
| WO | 02/067388 A2 | 8/2002 |

OTHER PUBLICATIONS

Extended European Search Report dated Feb. 18, 2021, including the Supplementary European Search Report and the European Search Opinion, in connection with corresponding EP Application No. 18850670.3 (8 pp.).
Office Action dated Jul. 6, 2021 in corresponding Korean Application No. 10-2020-7001884; 6 pages including English-language translation.
Office Action dated Apr. 20, 2021 in corresponding Korean Application No. 10-2020-7001884; 10 pages including English-language translation.
Office Action dated Jul. 9, 2019, in corresponding Japanese Application No. 2017-242085; 4 pages.
English translation of International Search Report dated Nov. 27, 2018 and Written Opinion in corresponding International application No. PCT/JP2018/031887; 6 pgs.
Chinese Office Action dated Apr. 6, 2021, in connection with corresponding CN Application No. 201880048489.6 (37pp., including machine-generated English translation).
Office Action dated Oct. 9, 2021, in connection with corresponding Chinese Application No. 201880048489.6 (20 pp., including machine-generated English translation).

* cited by examiner

LASER PROCESSING APPARATUS, LASER PROCESSING METHOD AND THIN PLATE PROCESSED USING THE SAME

FIELD

The present invention relates to a laser processing apparatus and a laser processing method for forming fine through holes in a matrix on a long thin plate, and a laser processed long thin plate material. And in particular, the present invention relates to a laser processing technique, which is used in manufacturing a gas diffusion layer of a fuel cell, for a thin plate and a processed product using the same.

BACKGROUND

Conventionally, etching processing using chemical reactions have been widely used when processing a thin metal plate to form fine through holes therein.

However, in forming through holes in a metal thin plate by etching processing, there has been big problems such as instability in shapes of through holes, large processing cost because of a large number of processes for wet processing, difficulty in forming through holes of 100 μm or less and difficulty in improving the processing speed.

Further, in cases where a thin plate is not a metal thin plate but a plastic or ceramic, there has been a problem that etching processing cannot be adopted.

On the other hand, in recent years, it has become technically possible to form through holes with a laser beam. By using a laser beam, finer through holes can be opened on a thin metal plate than by using etching processing, and plastics and ceramics can be processed.

For example, Japanese Patent Laid-Open No. 2000-165017 discloses an apparatus that forms a through hole by irradiating a laser beam onto a sheet attached to a cylindrical drum (Patent Literature 1).

Also, Japanese Patent Laid-Open No. 2003-334673 discloses a laser processing method in that a flexible long substrate is transported on the outer peripheral of a translucent hollow reel, and the focal point of pulsed light irradiated from the inside of the hollow reel is moved in the axial and/or circumferential directions (Patent Literature 2).

Further, in order to form a periodic structure on the inner peripheral surface of a cylindrical body, Japanese Patent Laid-Open No. 2000-200698 discloses a laser processing method in that pulsed light, which is introduced from the axial direction to the inside of the cylindrical body, is guided in the outer diameter direction by a condensing lens and a reflecting mirror, and then the reflecting mirror is rotated and the cylindrical body is rotated and moved in axial direction (Patent Literature 3).

CITATION LIST

Patent Literature

[Patent Literature 1] Japanese Patent Laid-Open No. 2000-165017
[Patent Literature 2] Japanese Patent Laid-Open No. 2003-334673
[Patent Literature 3] Japanese Patent Laid-Open No. 2000-200698

SUMMARY

However, an apparatus that forms a through hole by irradiating a laser beam onto a sheet attached to a cylindrical drum cannot perform continuous processing, and because it processes for a unit of sheets, it is necessary to change the sheet frequently. Thus, there was a limit to improving the processing speed.

Also, in opening holes in a matrix on a long thin plate by a laser processing method in that a flexible long substrate is transported on the outer peripheral of a translucent hollow reel and the focal point of pulsed light irradiated from the inside of the hollow reel is moved in the axial and/or circumferential directions, it is necessary to alternately and intermittently control the reciprocation of the laser apparatus in the axial direction and control the transportation of the long substrate in the reel direction. Thus, there was a limit to improve the processing speed.

Further, in order to form a periodic structure on the inner peripheral surface of the cylindrical body, in opening holes in a matrix on a long thin plate by a laser processing method in that pulsed light, which is introduced from the axial direction to the inside of the cylindrical body, is guided in the outer diameter direction by a condensing lens and a reflecting mirror, and then, the reflecting mirror is rotated and the cylindrical body is rotated and moved in axial direction, it is necessary to alternately and intermittently two control. One control is control of the linear reciprocation in the axial direction of the cylindrical body. The other control is control of the rotation of the cylindrical body and the reflecting mirror. Thus, there was a limit to improving the processing speed.

In general methods of scanning a thin plate with a laser beam using a rotating polygon mirror or galvanometer mirror for forming a through hole in a matrix, an fθ lens is used to form an image on a thin plate and scan the thin plate at a constant speed with a laser beam reflected at an equal angular speed by a rotating polygon mirror. But there are problems that if the diameter of the beam incident to the fθ lens is increased, the laser beam is blurred on the thin plate, and conversely, if the diameter of the beam incident to the fθ lens is decreased, the diameter of the beam on the thin plate is increased.

Also, in a case where the focal length is increased in order to reduce the swing angle from the fθ lens, there is a problem that the diameter of the beam is increased, and it is difficult to form uniform through holes.

Furthermore, in such a method, the power density of the laser beam varies depending on the processing portion. Therefore, there is a problem that burrs are generated around through holes where energy more than necessary is applied.

The present invention solves the problems of the prior art as described above, and the object of the present invention is to provide a laser processing apparatus, a laser processing method and a laser processing for improving the processing speed and continuously opening uniform and highly accurate through holes when processing for forming fine through holes in a matrix in a long thin plate, and to provide a thin plate processed using the same.

Solution to Problem

A laser processing apparatus of the present invention comprises a hollow cylindrical body having an opening on a circumferential surface around which a thin plate to be processed is wound obliquely, a thin plate transfer means for transferring a thin plate wound around the cylindrical body in the longitudinal direction of the thin plate, a motor having a rotation axis arranged coaxially with a central axis of the cylindrical body, a reflecting member fixed to a rotating shaft of the motor, a laser light emitting means for emitting pulsed light, wherein the apparatus continuously opens a large number of through holes in the thin plate by, while transferring the thin plate in the longitudinal direction, entering the pulsed light from the direction of the rotation axis, reflecting the pulsed light to the radial direction of the cylindrical body by the reflecting member and irradiating the thin plate with the pulsed light through the opening to solve the above-described problems.

A laser processing apparatus of the present invention is a laser processing apparatus in that, the intensity and pulse width of the pulsed light are adjusted so as to open a through hole in the thin plate with a single pulse irradiation to solve the above-described problems.

A laser processing apparatus of the present invention is a laser processing apparatus in that, a light condensing means for condensing the pulsed light on a thin plate is disposed between the reflecting member and the thin plate to solve the above-described problems.

A laser processing apparatus of the present invention is a laser processing apparatus in that a light condensing means for condensing the pulsed light on a thin plate is disposed separately between the reflecting member and the thin plate and between the reflecting member and the laser light emitting means to solve the above-described problems.

A laser processing apparatus of the present invention is a laser processing apparatus in that a light condensing means for condensing the pulsed light on a thin plate is disposed between the reflecting member and the laser light emitting means to solve the above-described problems.

A laser processing method of the present invention is a laser processing method in that a large number of through holes are opened continuously in a thin plate, by winding a thin plate to be processed obliquely around a hollow cylindrical body having an opening on a circumferential surface, and by, while transferring the thin plate in the longitudinal direction of the thin plate with a thin plate transfer means, entering pulsed light emitted from a laser light emitting means from the direction of a rotation axis of a motor that is arranged coaxially with a central axis of the cylindrical body, reflecting the pulsed light to the radial direction of the cylindrical body by a reflecting member that is fixed to a rotating shaft of the motor, and then irradiating the thin plate with the pulsed light through the opening to solve the above-described problems.

A laser processing method of the present invention is a laser processing method in that, the rotation period of the motor and the transfer speed of the thin plate transfer means are adjusted to be respectively constant to solve the above-described problems.

A laser processing method of the present invention is a laser processing method in that, the light emission timing of pulsed light emitted by the laser light emitting means is set in synchronization with the rotation of the motor so as to eject the pulsed light to the opening via the reflecting member to solve the above-described problems.

A thin plate according to claim 9 of the present invention is a thin plate with a large number of through holes formed by a laser processing apparatus or by a laser processing method to solve the above-described problems.

A thin plate of the present invention is a thin plate and made of metal to solve the above-described problems.

According to a laser processing apparatus of the present invention, the laser processing apparatus comprises a cylindrical body having an opening on a circumferential surface around which a thin plate to be processed is wound obliquely, a thin plate transfer means for transferring a thin plate wound around the cylindrical body in the longitudinal direction of the thin plate, a motor having a rotation axis arranged coaxially with a central axis of the cylindrical body, a reflecting member fixed to a rotating shaft of the motor, a laser light emitting means for emitting pulsed light. The apparatus, while transferring a long flexible thin plate in the longitudinal direction, enters the pulsed light from the direction of the rotation axis, reflects the pulsed light to the radial direction of the cylindrical body by the reflecting member, repeatedly scans the thin plate with the pulsed light at a high speed in the same direction by one row and irradiates the thin plate with the pulsed light through the opening. Therefore, a large number of fine through holes having a uniform shape and arrangement can be opened and the processing speed can be remarkably improved.

According to a laser processing apparatus of the present invention, the intensity and pulse width of the pulsed light are adjusted so as to open a through hole in the thin plate with a single pulse irradiation. Then, regardless of the position of the fine through hole in the thin plate, the power density of the pulsed light is uniform. Therefore, the shapes of the through holes can be formed uniformly and the generation of burrs around the fine through holes can be suppressed. As a result, a laser processing with high accuracy can be performed.

According to a laser processing apparatus of the present invention, a light condensing means for condensing the pulsed light on a thin plate is disposed between the reflecting member and the thin plate. Therefore, the focal length of the condensing lens can be shortened and the condensing lens can be reduced in size.

According to a laser processing apparatus of the present invention, a light condensing means for condensing the pulsed light on a thin plate is disposed separately between the reflecting member and the thin plate and between the reflecting member and the laser light emitting means. Therefore, since the condensing position and the focal position can be adjusted individually, the focal position can be easily adjusted.

According to a laser processing apparatus of the present invention, a light condensing means for condensing the pulsed light on a thin plate is not rotated by the motor. Therefore, the focal position of the pulsed light can be easily adjusted even while the motor is rotating.

According to a laser processing method of the present invention, a large number of through holes are opened continuously in a thin plate, by winding a thin plate to be processed obliquely around a hollow cylindrical body having an opening on a circumferential surface, and by, while transferring the thin plate in the longitudinal direction of the thin plate with a thin plate transfer means, entering pulsed light emitted from a laser light emitting means from the direction of a rotation axis of a motor that is arranged coaxially with a central axis of the cylindrical body, reflecting the pulsed light to the radial direction of the cylindrical body by a reflecting member that is fixed to a rotating shaft of the motor, and then irradiating the thin plate with the pulsed light through the opening. The method, while continuously transferring a long flexible thin plate, repeatedly scans the thin plate with the pulsed light at a high speed in the same direction by one row. Therefore, fine through holes having a uniform shape and arrangement can be continuously opened and the processing speed can be remarkably improved.

According to a laser processing method of the present invention, the rotation period of the motor and the transfer speed of the thin plate transfer means are adjusted to be respectively constant. Therefore, a laser processing can be performed so that the through holes are arranged in a matrix on the thin plate.

According to a laser processing method of the present invention, the light emission timing of pulsed light emitted by the laser light emitting means is set in synchronization with the rotation of the motor so as to eject the pulsed light to the opening via the reflecting member. Then, the laser light emitting means is controlled in synchronization with the rotation of the motor so that the pulsed light is emitted only at timings when the pulsed light reflected by the reflecting member passes through the opening, and light emission pose periods are set so that the inner surface of the cylindrical body is not irradiated with the pulsed light. Therefore, the wear and the damage of the apparatus can be suppressed and low-cost laser processing with reduced power consumption cam be performed.

According to a thin plate of the present invention, a large number of through holes are formed on the thin plate by a laser processing apparatus or by a laser processing method. Therefore, a large number of fine through holes can be arranged in a uniform shape.

According to a thin plate of the present invention, the thin plate is made of metal. Therefore, the thin plate can be provided with excellent strength and conductivity, and a large number of fine through holes can be arranged in a uniform shape.

DETAILED DESCRIPTION

Figure 1:
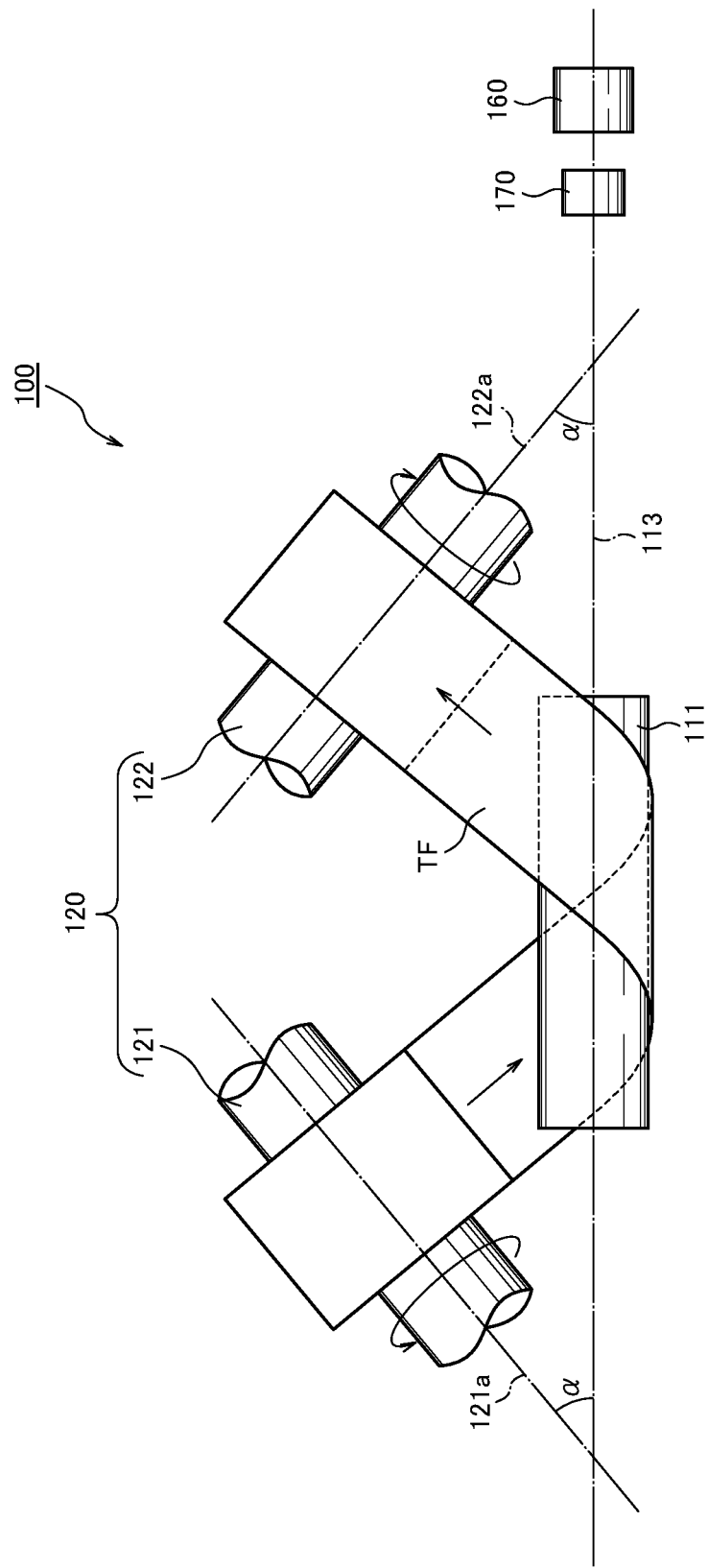
FIG. 1 is a schematic diagram of a laser processing apparatus according to a first example of the present invention.

A laser processing apparatus in the present invention comprises a cylindrical body having an opening on a circumferential surface around which a thin plate to be processed is wound obliquely, a thin plate transfer means for transferring a thin plate wound around the cylindrical body in the longitudinal direction of the thin plate, a motor having a rotation axis arranged coaxially with a central axis of the cylindrical body, a reflecting member fixed to a rotating shaft of the motor, a laser light emitting means for emitting pulsed light, wherein the apparatus continuously opens through holes in the thin plate by, while transferring the thin plate in the longitudinal direction, entering the pulsed light from the direction of the rotation axis, reflecting the pulsed light to the radial direction of the cylindrical body by the reflecting member and irradiating the thin plate with the pulsed light through the opening. As long as the apparatus has configuration described above, the specific embodiment doesn't matter. Here, the thin plate means a flexible member including a film or a sheet, and the material may be a metal, a synthetic resin, paper, cloth, or the like.

The cylindrical body used in the laser processing apparatus in the present invention can typically be configured to have a cylindrical outer shape, but it is not limited to this configuration.

The cylindrical body has a function of winding a long thin plate to define a processing position. Thus, the peripheral surface (cylindrical surface) only need to have a cylindrical shape at least in a portion where the long thin plate is in contact. Therefore, the cylindrical body may have, for example, a columnar shape whose cross section is semicircular. It should be noted that in order to place other various devices inside the cylindrical body, it is preferable to be provided with a space for that purpose.

The cylindrical body can be formed by joining a cylindrical left drum and a cylindrical right drum both having the same diameters, but it is not limited to this configuration.

In order to be able to place various devices inside, introduce pulsed light from the outside, and eject from the opening, for example, the entire cylindrical body may be configured to be integral and provided with an opening, attachment portions for various devices, operating spaces for various devices, a path of pulsed light, a working window and the like in necessary portions.

In a case where the cylindrical body is formed by joining a cylindrical left drum and a cylindrical right drum both having the same diameter, the motor is fixed in the space of a joining portion in the left drum. On the other hand, the right drum has a path for introducing pulsed light, and has a structure in which the pulsed light incident on the right drum reaches the joining portion of the left drum and the right drum.

For this purpose, there is a window at the center of the right end surface of the right drum and the right drum is hollow. This configuration has sufficient function and can be realized at low cost.

If an optical waveguide is formed in the cylindrical body so that the pulsed light travels along the rotation axis by a timing when the pulsed light irradiates the reflecting member, the optical axis of the pulsed light does not necessarily coincide with the rotation axis in a phase when the pulsed light enters the cylindrical body. And it is also possible to introduce pulsed light into the cylindrical body from a portion other than the right end surface.

Here, in a case where the outer surface of the cylindrical body is a columnar shape or a cylindrical shape, the central axis of the cylindrical body is an axis passing through the center of the cross section and extending in the longitudinal direction and thus means the geometric central axis.

If the cylindrical body is not cylindrical as a whole, the central axis of the cylindrical body means the central axis of curvature determined in the same way as the cylinder on the basis of the circumferential surface that has a shape of a side surface of a cylinder to be contact with a thin plate.

Regardless of the shape of the entire cylindrical body, the circumferential surface, with which the thin plate comes into contact, is preferred to have low friction and wear resistance. Thus, the surface may be processed with various fluorine resin coatings or the like.

In this case, as fluorine resin, PTFE (polytetrafluoroethylene), PFA (tetrafluoroethylene-perfluoroalkyl vinyl ether copolymer), FEP (tetrafluoroethylene-hexafluoropropylene copolymer), ETFE (tetrafluoroethylene-ethylene copolymer), PVDF (polyvinylidene fluoride), PCTFE (polychlorotrifluoroethylene), E CTFE (chlorotrifluoroethylene-ethylene copolymer) can be suitably used.

In addition, an opening is provided in the center in the longitudinal direction on the circumferential surface of the cylindrical body. Since the opening is formed along the circular arc of the circumferential surface of the cylindrical body, the shape of the thin plate transferred in close contact with the circumferential surface is also defined as a cylindrical shape in the opening.

For this reason, if the central axis and the rotation axis coincide, a through hole can be formed at a constant distance from the light collecting means.

The opening is a passage for pulsed light ejected from the inside of the cylindrical body toward the outer shape, and also a portion on which the thin plate is processed. Therefore, the shape of the opening is preferably a narrow slit along the circumferential surface.

This is because the longer the length of the opening in the direction along the circular arc of the cylindrical body is, the longer the scan distance with the pulsed light is. Then the processing is performed more efficiently.

On the other hand, if the width of the opening in the axial direction of the cylindrical body is increased, the function of defining the position of the thin plate, which is wound around the cylindrical body, is weakened and the processed position of the thin plate may shift from the focus point of the pulsed light. Therefore, the width of the opening is preferably set small.

In order to maintain the processing accuracy, it is preferable that the thin plate is processed at a portion of the cylindrical body where the shape of the thin plate is strongly defined. For this reason, it is preferable that the processing position for the thin plate by irradiating with the pulsed light is set to a portion on the upstream side in the opening and just after the portion where the thin plate reaches the opening.

The circumferential angle around which the thin plate is wound around the cylindrical body can be arbitrarily set as long as it covers the slit-shaped opening.

Therefore, for example, if the opening angle of the opening with respect to the central axis is set to n (rad), the angle for winding the thin plate around the cylindrical body is only needed to be set to n (rad) or more.

The maximum width of the processed area in the thin plate is restricted by the length along the arc of the slit-shaped opening.

Moreover, since the thin plate is wound in an oblique direction, the processable width dimension of the thin plate is defined by the length of the opening along the arc and the angle around which the thin plate is winding.

The length of the opening along the arc is defined by the opening angle of the opening with respect to the central axis and the distance (radius) from the central axis to the circumferential surface.

If the opening angle of the opening relative to the central axis is ß (rad) and the radius of the cylindrical body is r, the length L along the arc of the opening can be expressed as $L = r \times ß$.

If the opening angle of the opening with respect to the central axis is ß, ß is $2\pi$ (rad) or less and can be freely set within the angle at which the thin plate can be wound in close contact with the circumferential surface of the cylindrical body. On the other hand, if ß is decreased, the processable angle is decreased. Therefore, the processing efficiency is decreased and only a part of the entire width of the thin plate can be processed.

A thin plate transfer means used in the laser processing apparatus of the present invention may have a configuration including a feeding reel for feeding out a flexible long thin plate and a taking-up reel for windingly taking up the long thin plate.

An adjusting means is preferably provided so that the rotation periods of the feeding reel and the taking-up reel can be adjusted individually or synchronously according to the transfer speed of the thin plate, the remaining amount of the feeding reel, and the taking-up amount of the taking-up reel.

The feeding speed of the thin plate can be freely set according to the pattern and pitch of through holes to be formed.

Generally, the feeding speed of the thin plate can be set to a constant value within the range of 0.5 m/min to 2.0 m/min, but is not limited to these values.

The feeding shaft, which constitutes the thin plate transfer means, is disposed obliquely with a deviation angle α with respect to the central axis, thus the thin plate is wound obliquely around the cylindrical body.

In this case, the deviation angle formed by a taking-up axis and the central axis is also preferably set to the same value. This is because no slack doesn't occur and excessive tension is not applied to the thin plate.

These axes do not necessarily cross each other, and the deviation angle α herein means an angle that is formed when two axes are projected onto a plane parallel to the two axes.

The range of the deviation angle α can be arbitrarily set to a value larger than 0 (rad) and smaller than $\pi/2$ (rad).

The larger the deviation angle α is within this range, the wider the thin plate can be processed. But the maximum width of the processed region is limited by the length of the slit-shaped opening along the arc.

Specifically, if the maximum width of the processing region in the width direction of the thin plate is W and the length of the slit-shaped opening along the arc is L, the relationship of $W = L \times \sin α$ is established.

The long thin plate is fed from the feeding reel, is wound around the cylindrical body, and is taken up by the taking-up reel, thus the position irradiated with the pulsed light ejected from the opening window shifts little by little in the long thin plate.

The processing position with the pulsed light on the thin plate shifts while the pulsed light rotates in the circumferential direction in the opening window. Therefore, when forming the through holes, the rows of formed through holes are aligned obliquely with respect to the longitude direction of the thin plate.

For this reason, in order to form through holes in a desired pattern, it is preferable to provide an adjusting means for keeping the transfer speed of the thin plate constant or appropriately setting the speed as variable.

As a motor used in the laser processing apparatus of the present invention, various motors usually used for rotating elements in optical systems can be used, and more specifically, a variety of AC motors, DC motors, stepping motors, servomotors, brushless motors, or gearmotors can be used.

The motor is fixed to inside the cylindrical body with the rotation axis of the motor coinciding with the central axis. The motor rotates the reflecting member fixed to the rotating shaft. In this way, the motor has a function of performing scan repeatedly in the circumferential direction with the pulsed light whose traveling direction is changed to the radial direction via the reflecting member.

The rotating direction of the motor doesn't matter, but the rotating direction is preferably along the transferring direction of the thin plate. This is because the shift amount of the processing position decreases during condensing the pulsed light on the thin plate.

The motor can be attached to the cylindrical body via a motor fixture having an adjusting screw.

In this case, since the motor can be finely adjusted with the adjusting screw, the rotation axis of the reflecting member described later can be finely adjusted, and consequently the irradiating position with the pulsed light can be finely adjusted. Therefore, this configuration is preferable for realizing a highly accurate through hole forming process.

The rotation period of the motor, as well as the transfer speed of the thin plate and the pulse cycle in the laser light emitting means, has a significant effect on the position and the pattern of the through holes in the thin plate. Thus, it is preferable to provide an adjusting means for keeping the rotation period constant or appropriately setting the period as variable.

The reflecting member used in the laser processing apparatus of the present invention is disposed in the path of the pulsed light, and an optical element that changes the traveling direction of the pulsed light in a right angle can be used as the reflecting member. More specifically, various reflecting mirrors or a right-angle prism can be used.

The reflecting member is fixed to an optical base, and then the optical base is attached to the rotating shaft of the motor. Thus, the reflecting member can be rotatably arranged inside the cylindrical body.

The reflecting member functions so that the pulsed light incident along the rotation axis is reflected to the radial direction of the cylindrical body and performs processing of the thin plate.

The pulsed light, whose traveling direction is changed in the radial direction by the reflecting member, is ejected from the slit-shaped opening toward the outside of the cylindrical body, and irradiates the thin plate, whose position is defined by the circumferential surface of the cylindrical body, and then a through hole is formed.

As the light condensing means used in the laser processing apparatus of the present invention, various optical lenses can be used. Specifically, either a spherical lens or an aspherical lens can be used.

In a case where the light condensing means is constituted by one or more optical lens, a plurality of lenses may be combined to form the light condensing means or a single aspherical lens may be used. A spherical lens and an aspherical lens may be combined.

The light condensing means is disposed on the path of the pulsed light and may be disposed between the reflecting member and the thin plate and may be disposed on the laser light emitting means side of the reflecting member.

If the light condensing means is configured by combining a plurality of optical lenses or using an aspherical lens, the generation of spherical aberration can be suppressed, and thus the incident diameter to the condensing lens can be increased. Therefore, the laser spot diameter at the focal point can be reduced.

Further, even in a case where the incident position of the pulsed light deviates, the processing accuracy can be maintained because the focal position does not change.

If the light condensing means is disposed between the reflecting member and the thin plate, a smaller lens having the same numerical aperture (NA) can be used than a case where the light condensing means is disposed on the laser light emitting means side of the reflecting member.

In this case, the light condensing means is fixed to the optical base together with the reflecting member, and is configured to be rotated by the motor via the optical base. Therefore, in order to adjust the light condensing means so that the pulsed light is focused on the thin plate, it is necessary to stop the rotation of the motor. However, if a focal position adjusting means, which is rotationally driven together with the light condensing means, is further provided, the focal position of the pulsed light can be adjusted even while the motor is rotating.

On the other hand, if the light condensing means is disposed on the laser light emitting means side of the reflecting member, the light condensing means is not rotated by the motor. Thus, the focal position of the pulsed light can be easily adjusted even while the motor is rotating.

In order to easily adjust the focal position with the light condensing means and increase the tolerance for temperature change, the light condensing means may be divided into two parts and these parts may be disposed separately into the thin plate side of the reflecting member and the laser light emitting means side of the reflecting member.

In this case, the light condensing means disposed on the thin plate side of the reflecting member exclusively has a function of condensing light, and the focal position is adjusted by the light condensing means on the laser light emitting means side of the reflecting member. This configuration provides a laser processing apparatus whose focal position can be easily adjusted.

As the laser light emitting means used in the laser processing apparatus of the present invention, various industrial laser light emitting apparatuses can be used. Specifically, KrF, ArF, XeCl, XeF excimer lasers, Nd-YAG lasers, CO2 lasers. CO lasers, nitrogen lasers, solid state lasers, ruby lasers, semiconductor lasers, tunable diode lasers, and the like can be used.

The laser light emitting means emits pulsed light for laser processing.

According to the physical properties of the thin plate, the pulse intensity (height) and the pulse duration (width) are set to the pulsed light so that a through hole can be formed with a single pulse irradiation.

The pulse period of the pulsed light emitted from the laser light emitting means can be set to 100 kHz or more and 120 kHz or less, but is not limited to these values.

The pulse width can be set to 1 nanosecond or more and 100 nanoseconds or less, but is not limited to these values. In general, the pulse width is preferably smaller because heat less influences the thin plate.

The period of the pulsed light emitted by the laser emitting means, as well as the transfer speed by the thin plate transfer means and the rotation period of the motor, has a significant effect on the position and the pattern of the through holes in the thin plate. Thus, it is preferable to provide an adjusting means for keeping the light emitting period constant or appropriately setting the period as variable.

The light emission timing of the pulsed light is preferably synchronized with the rotation of the motor. The pulsed light introduced into the cylindrical body is reflected by the reflecting member and the traveling direction of the pulsed light changes to the radial direction of the cylindrical body. It is preferable that the laser light emitting means is controlled so that the light emission pose period is set in synchronization with the rotation of the motor so that the pulsed light is ejected only at timings at which the pulsed light passes through the opening. This is because if the pulsed light is ejected at timings at which the pulsed light isn't ejected from the opening to the outside of the cylindrical body, the apparatus may be worn and damaged by irradiating the inner surface of the cylindrical body with the pulsed light, and power may be consumed wastefully.

The angle range with respect to the rotation axis in which the pulsed light irradiates the thin plate is desirably less than the angle range in which the condensed pulsed light is ejected from the opening to the outside of the cylindrical body.

Therefore, if the opening angle of the opening with respect to the central axis is represented by ß and the irradiation angle of the pulsed light with respect to the rotation axis is represented by γ, it is preferable that there is a relationship of ß≥γ.

In the laser processing apparatus of the present invention, one of various beam expanders can be disposed on the path of the pulsed light.

By disposing the beam expander in the path of the pulsed light, the laser can enter the light condensing means with its diameter being enlarged. Then, when the laser is focused on the thin plate to be processed, the beam spot diameter can be reduced and a high-power density can be obtained. As a result, it is preferably possible to perform fine laser processing with little thermal influence.

The laser processing using the laser processing apparatus of the present invention can be suitably applied to any long thin plate having flexibility. In addition to a metal thin film and a resin sheet, composite material such as metal oxide-containing thin film and other composite material having flexibility can be processed.

For example, copper, aluminum, nickel, and various stainless steels can be used as metal materials, and various conductive plastics such as polythiophene type, polyacetylene type, polyaniline type, and polypyrrole type, engineering plastics such as PPSU, PSU, PAR, PEI, PEEK, PPS, PES, PAT, LCP, PTFE, PCTFE, PVDF, PC, m-PPE, PA6, PA66, POM, PET, PBT and U-PE and general purpose plastics such as PVC, PS, ABS, AS, PMMA, PE and PP can be used as resin material.

The width of the thin plate can be arbitrarily set as long as it can be wound around the cylindrical body. However, it is generally preferable that the width is 140 mm or more because of high working efficiency.

Example 1

A laser processing apparatus according to the first example of the present invention will be described below with reference to FIGS. 1 to 6, together with a laser processing method and a laser processed long thin plate material.

Figure 2:
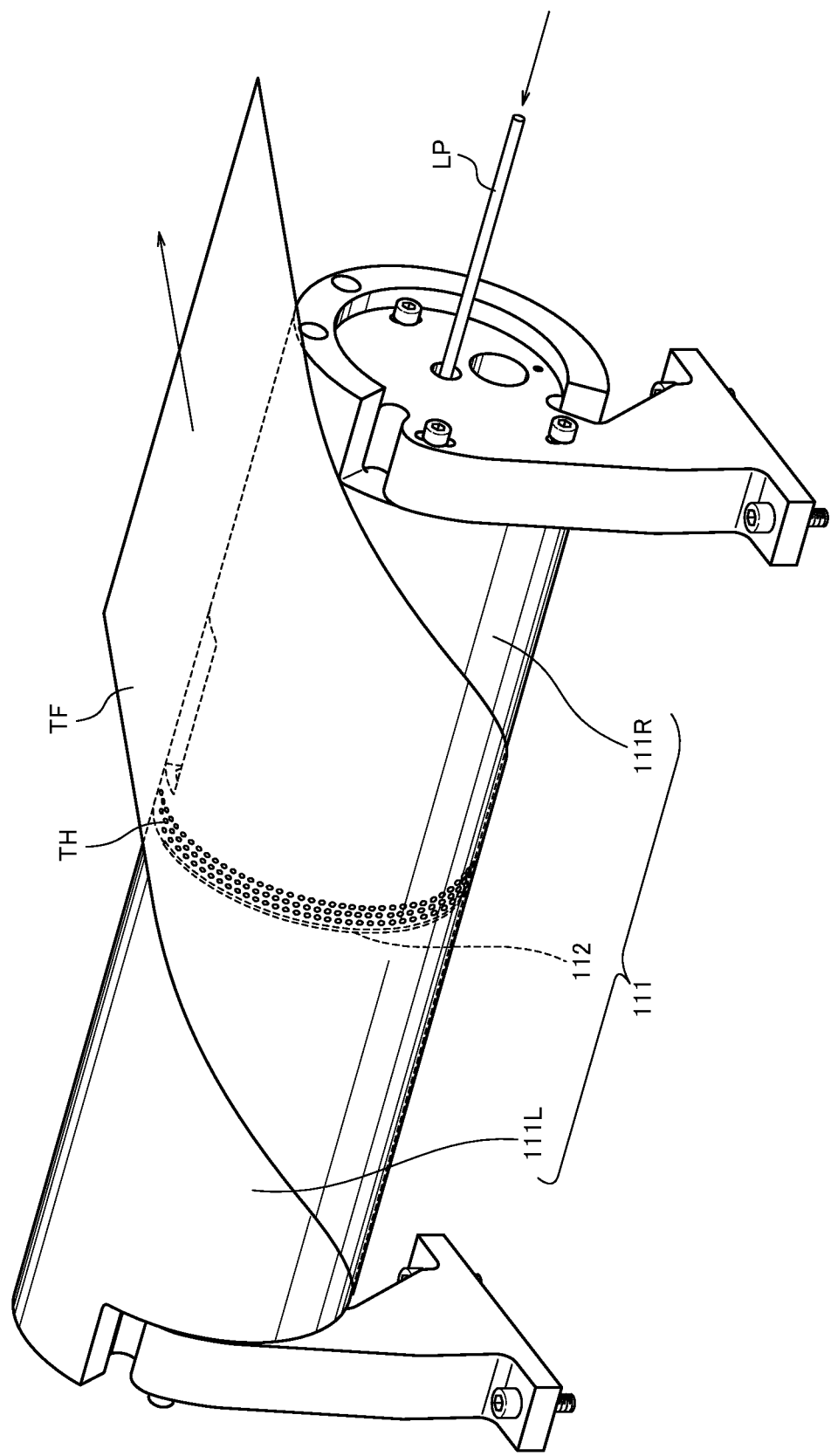
FIG. 2 is a diagram illustrating a relationship between a cylindrical body and a thin plate according to the first example of the present invention.
Figure 3:
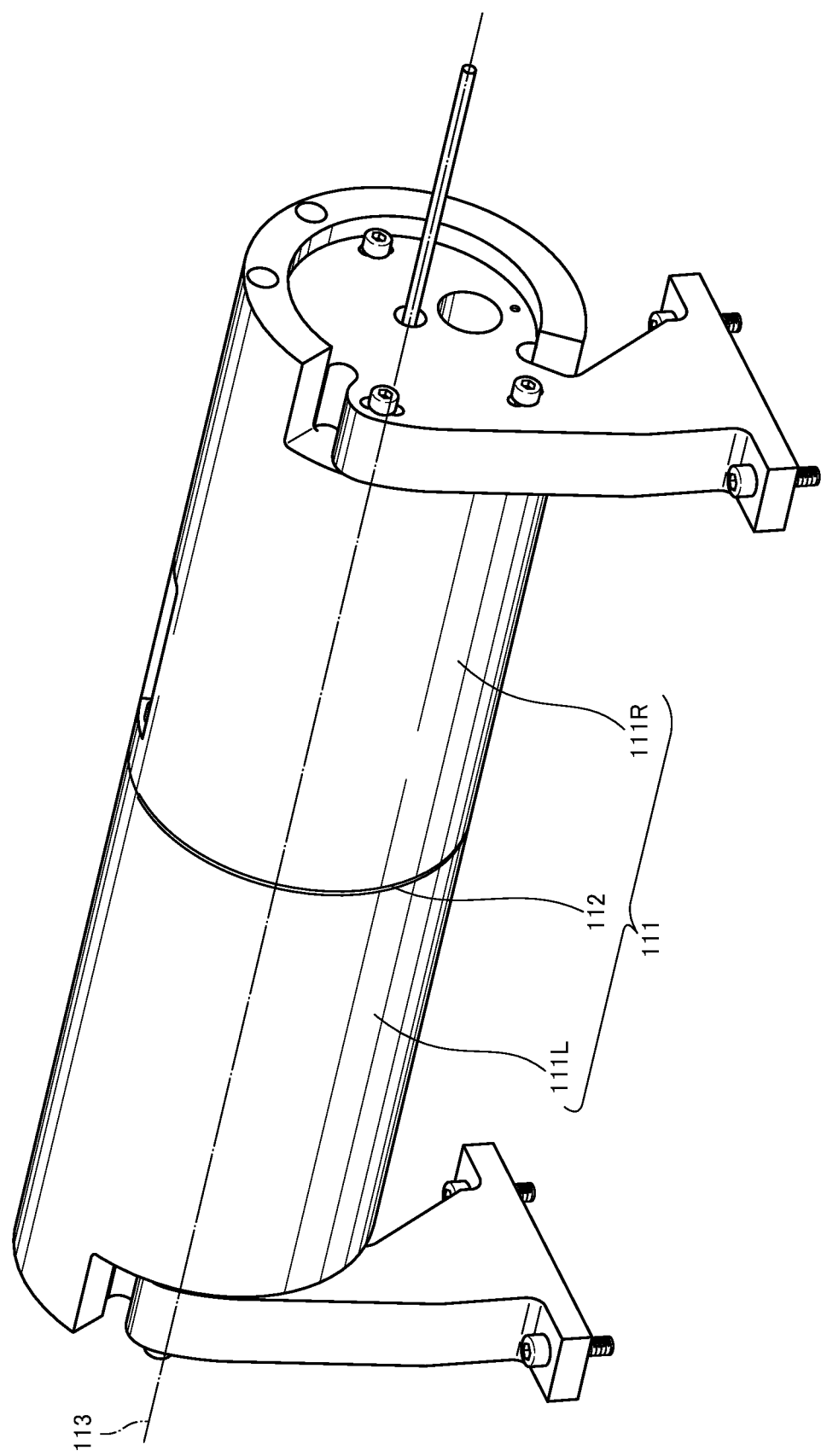
FIG. 3 is a diagram illustrating the appearance of the cylindrical body according to the first example of the present invention.
Figure 4:
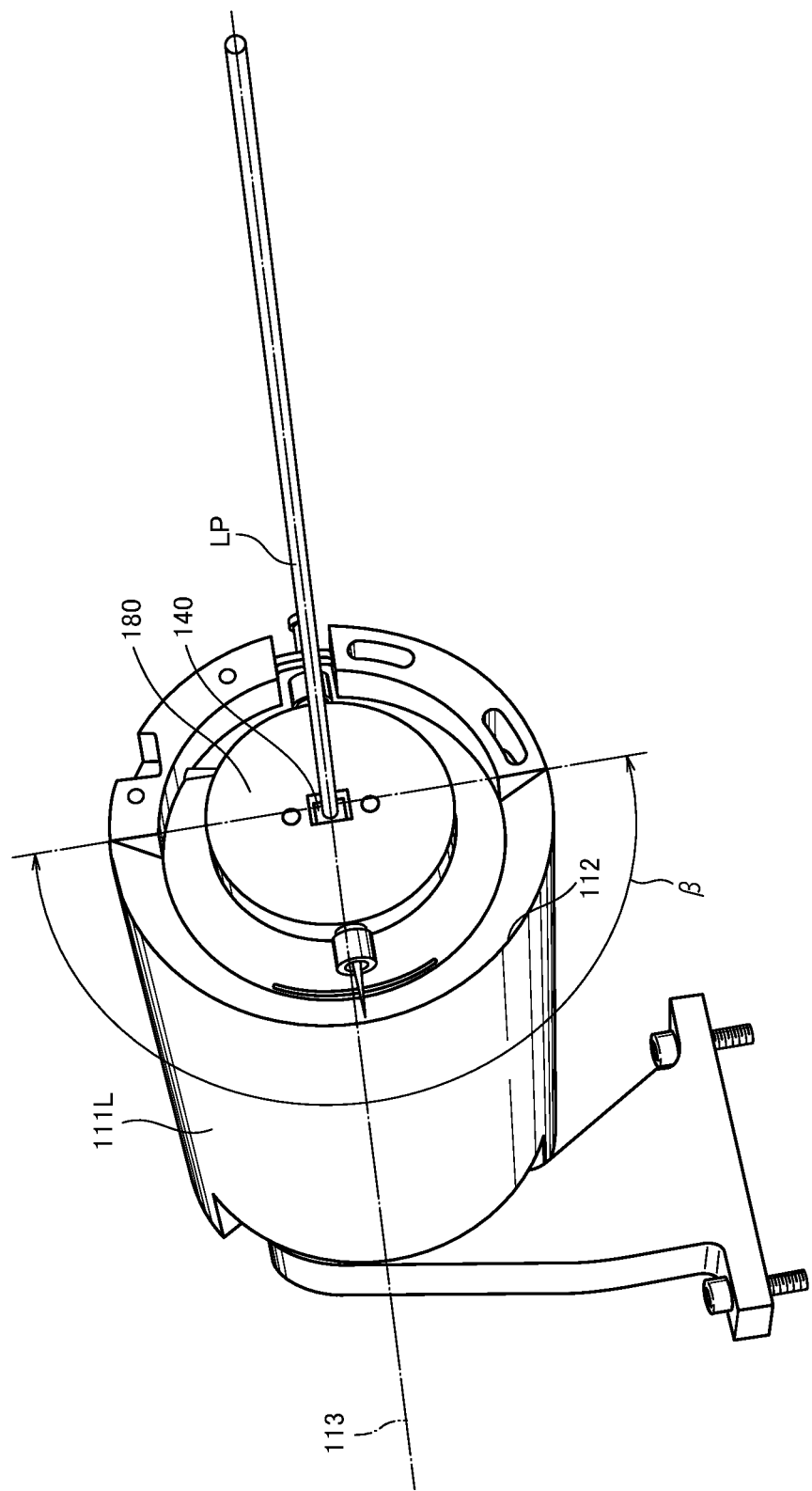
FIG. 4 is a diagram illustrating a configuration of an opening of the cylindrical body according to the first example of the present invention.
Figure 5:
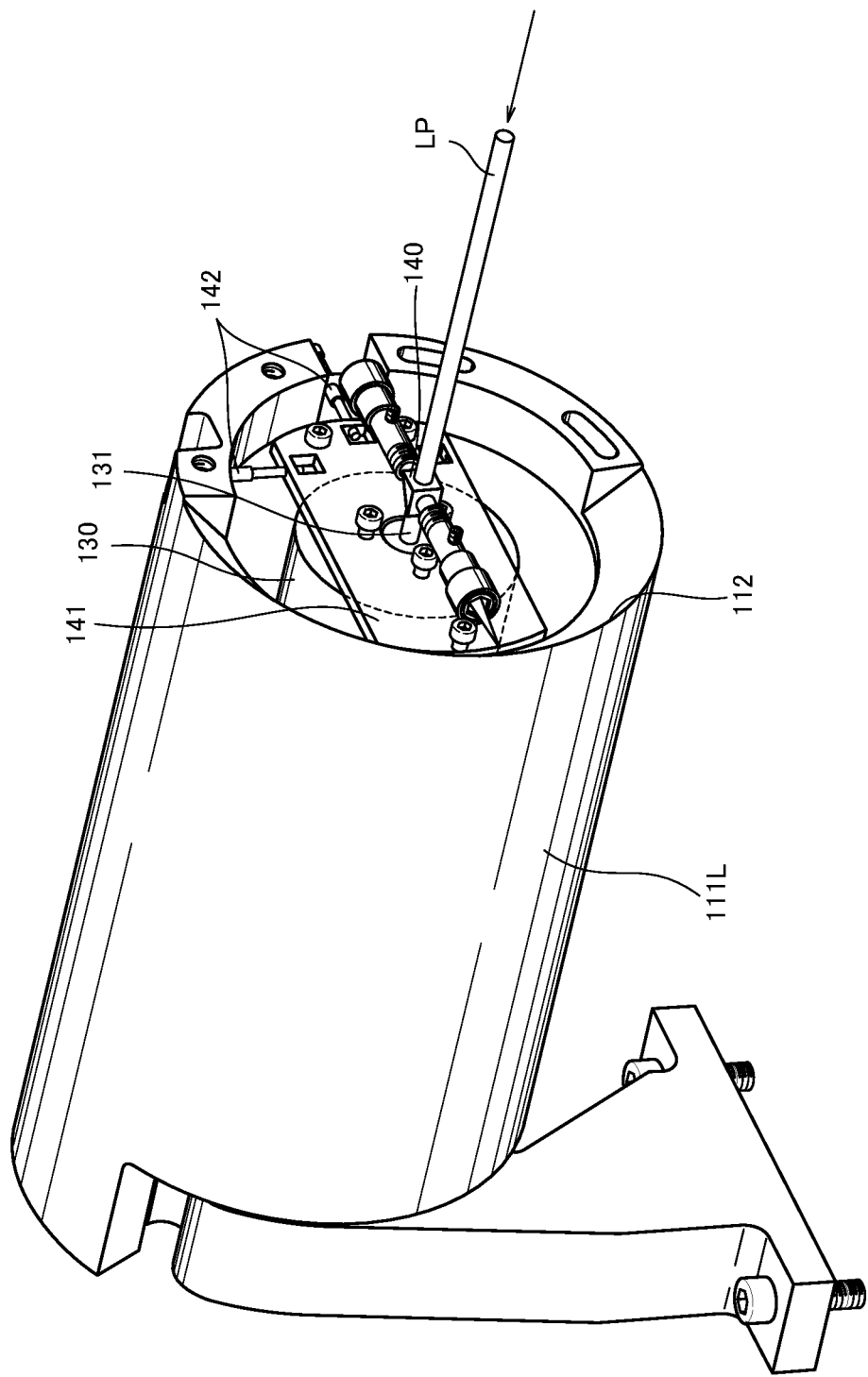
FIG. 5 is a diagram illustrating the arrangement of a reflecting members according to the first example of the present invention.
Figure 6:
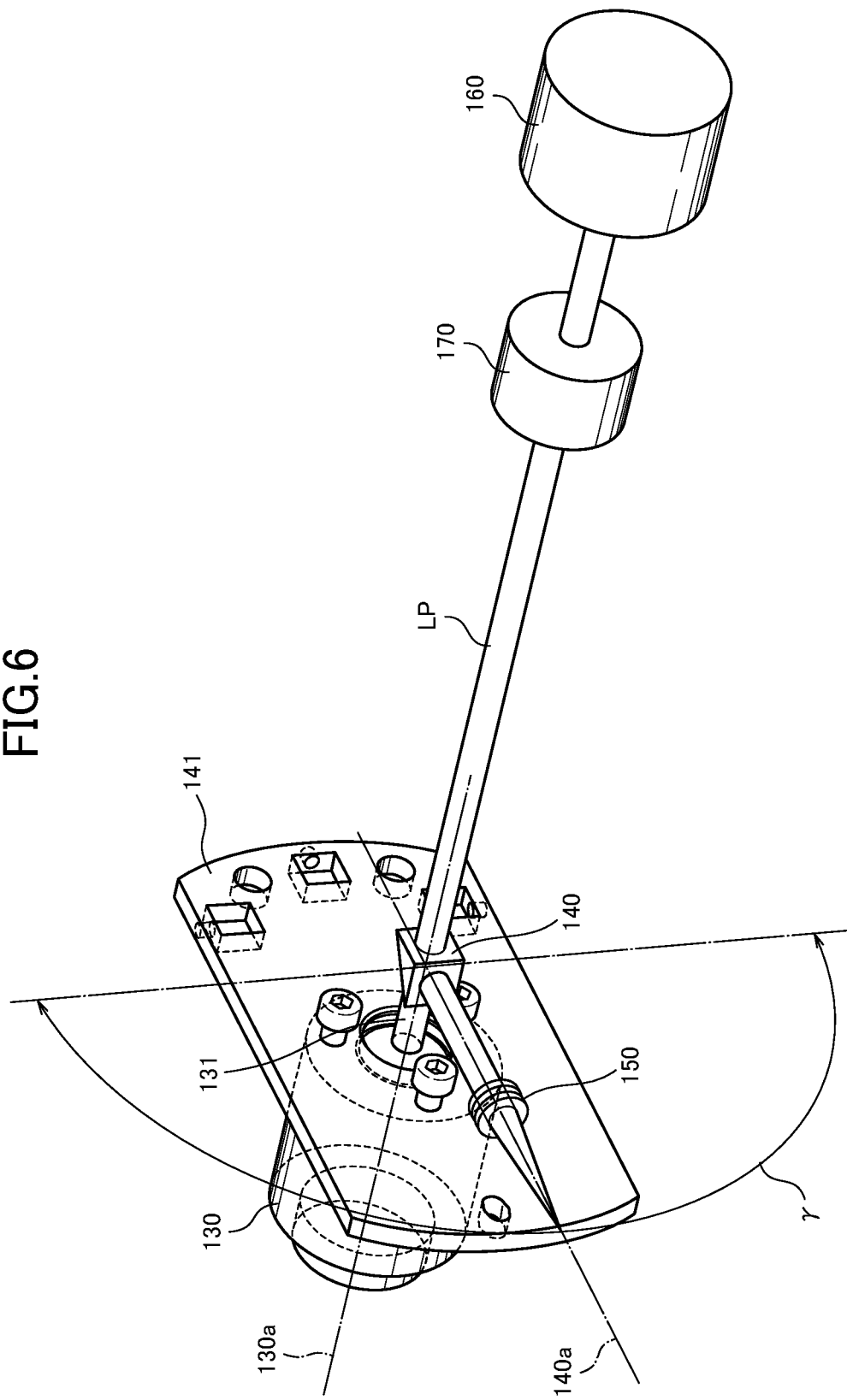
FIG. 6 is a diagram illustrating a path and an irradiation angle of pulsed light of the laser processing apparatus according to the first example of the present invention.

Here, FIG. 1 is a schematic diagram of a laser processing apparatus according to a first example of the present invention. FIG. 2 is a diagram illustrating a relationship between a cylindrical body and a thin plate according to the first example of the present invention. FIG. 3 is a diagram illustrating the appearance of the cylindrical body according to the first example of the present invention. FIG. 4 is a diagram illustrating a configuration of an opening of the cylindrical body according to the first example of the present invention. FIG. 5 is a diagram illustrating the arrangement of a reflecting members according to the first example of the present invention. And, FIG. 6 is a diagram illustrating a path and an irradiation angle of pulsed light of the laser processing apparatus according to the first example of the present invention.

In case of processing a long thin metal (e.g. copper) plate TF with a laser processing apparatus 100 of the present example, a thin plate transfer means 120 is arranged as shown in FIG. 1 so that the thin plate TF wound around a feeding reel 121 is pulled out, wound obliquely around a cylindrical body 111, and then taken up by a taking-up reel 122 in the longitudinal direction at a constant transfer speed.

In the present example, a deviation angle α formed by a central axis 113 and a feed axis 121a is π/4 (rad). In this case, the angle formed by a taking-up axis 122a of the taking-up reel 122 and the central axis 113 is also π/4.

A laser light emitting means 160 and a beam expander 170 are arranged so that their optical axes are coaxial with the central axis 113.

As shown in FIG. 2, the circumferential surface, around which the thin plate TF to be processed is wound, of the cylindrical body 111 has the shape of the outer surface of a column. Thus, the thin plate TF, which is in close contact with the cylindrical body 111, has a cylindrical shape at least in a portion in contact with the cylindrical body 111.

In the present example, the winding angle is about n (rad), and accordingly, a circumferential portion equal to or more than n (rad) is formed.

As shown in FIGS. 2 and 3, the cylindrical body 111 of the present example is formed by joining a cylindrical left drum 111L and a cylindrical right drum 111R having the same diameters. As a result, the cylindrical body 111 as a whole has a long hollow cylindrical appearance.

A slit-shaped opening 112 that is long along the circumferential direction is formed on the front side of the portion where the left drum 111L and the right drum 111R are joined, and the thin plate TF is wound around the cylindrical body 111 so as to cover the opening 112.

In the cylindrical body 111 of the present example, the pulsed light LP is incident on the cylindrical body 111 so that the optical axis of the pulsed light LP is coaxial with the central axis 113 of the cylindrical body 111. For this purpose, an incident window for pulsed light LP is formed at the center of the right end surface of the right drum 111R.

As shown in FIG. 4, the left drum 111L constituting the cylindrical body 111 has a shape in which the opening 112 is formed at a joining portion of the left drum 111L and the right drum 111R.

The opening 112 is configured to be formed in a slit shape that is long in the circumferential direction on the front side of the cylindrical body 111 so that the opening angle ß of the opening 112 with respect to the central axis 113 is about π (rad).

A reflecting member 140 is fixed to an optical base 180, and the pulsed light LP incident on the reflecting member 140 is reflected by the reflecting member 140 and the traveling direction is changed in a right angle, in other words the pulsed light LP travels via the reflecting member 140. And then, the pulsed light LP travels in the radial direction of the cylindrical body 111 and is ejected from the opening 112 to the outside of the cylindrical body 111.

The pulsed light LP ejected from the slit-shaped opening 112 irradiates and processes the thin plate TF having a cylindrical shape along the cylindrical body 111.

As shown in FIG. 5, a motor 130 is fixed to the left drum 111L, which constitutes the cylindrical body 111, by a fixing means 141.

The fixing means 141 includes an adjusting screw 142. By rotating the adjusting screw 142, the direction of a rotation axis 130a can be finely adjusted to arrange the rotation axis 130a of the motor 130 coaxially with the central axis 113 of the cylindrical body 111.

As shown in FIG. 6, the reflecting member 140 is fixed to the optical base 180, and the optical base 180 is connected to a rotating shaft 131 of the motor 130. Thus, the reflecting member 140 is rotatably arranged.

The pulsed light LP emitted from the laser light emitting means 160 passes through the beam expander 170, and the beam diameter is enlarged. Then, the pulsed light LP enters the reflecting member 140.

The pulsed light LP reflected by the reflecting member 140 is condensed on the thin plate TF by a light condensing means 150, which is disposed between the reflecting member 140 and the thin plate TF.

Since the reflecting member 140 is connected to the rotating shaft 131 of the motor 130 via the optical base 180 to be arranged rotatably, the ejection direction 140a of the pulsed light LP, which is reflected by the reflecting member 140, changes in a plane perpendicular to the central axis 113 of the cylindrical body 111 in accordance with the rotation of the reflecting member 140. And then, the pulsed light LP is ejected from the opening 112 so that the pulsed light LP performs a scan in a range of the irradiation angle γ of the pulsed light LP with respect to the rotation axis 130a.

Depending on the orientation of the reflecting member 140, the ejection direction 140a of the pulsed light LP deviates from the range of the irradiation angle γ of the pulsed light LP with respect to the rotation axis 130a. Thus, the laser emission means 160 is controlled so as not to emit the pulsed light LP at such timings.

In a case where the through hole TH is formed in a copper thin plate TF, which is a long thin metal plate TF, using the laser processing apparatus 100 according to the present example, even if the through hole TH is formed at any position of the opening 112, the adjusting screw 142 and the light condensing means 150 are firstly adjusted so that the pulsed light LP is condensed at a desired position on the thin plate TF. Thereafter, the motor 130 is rotated to rotate the right-angle prism as the reflecting member 140.

Next, the copper thin plate TF wound around the feeding reel 121 is pulled out, wound obliquely with respect to the cylindrical body 111 so as to cover the opening 112, and further wound around the taking-up reel 122. And then, the rotation periods of the feeding reel 121 and the taking-up reel 122 are controlled to rotate the feeding reel 121 and the taking-up reel 122 so that the feeding speed becomes, for example, 1 m/min.

A pulsed light having, for example, a light emission period of 111 kHz and a pulse width of 10 nsec is emitted from the laser light emitting means 160, and the pulsed light enters the incident window on the right end surface of the cylindrical body 111 via the beam expander 170 to irradiate the reflecting member 140 so that the through hole TH is formed in the thin plate TF with a single pulse irradiation.

At this time, the laser light emitting means 160 is controlled in synchronization with the rotation of the motor 130, and the light emission pause period is set so that the pulsed light LP is emitted only at timings at which the pulsed light LP reflected by the reflecting member 140 passes through the opening 112.

By appropriately adjusting and controlling the rotation period of the motor 130, the feeding speed of the thin plate TF, and the setting of the pulsed light LP, for example 1000 pieces of through holes TH at a pitch of 140 µm can be continuously formed in a diagonal line with respect to the thin plate TF during one rotation of the motor 130. Further, by repeatedly forming a row of through holes TH a plurality of times in the same direction while transferring the thin plate TF, a cooper thin plate TF with a pattern of the through holes TH formed in an equally arranged matrix can be obtained.

As described above, according to the laser processing apparatus 100 of the present example, a large number of fine through holes TH having a uniform shape and arrangement can be continuously opened in a thin plate TF with suppressed generation of burrs, and laser processing can be performed for a thin plate TF with high accuracy and remarkably improved working efficiency.

Further, according to the laser processing method of the present example, a large number of fine through holes TH having a uniform shape and arrangement can be continuously opened in a thin plate TF with suppressed generation of burrs, and laser processing can be performed for a thin plate TF with high accuracy, remarkably improved working efficiency and low cost due to suppressed wear of the apparatus.

Furthermore, the thin plate TF of the present example has a large number of fine through holes TH uniformly shaped and arranged, thus the thin plate TF can be a thin copper plate TF excellent in strength and conductivity.

Example 2

Next, a laser processing apparatus according to the second example of the present invention will be described with reference to FIGS. 7 to 10, together with a laser processing method and a laser processed long thin plate material.

Figure 7:
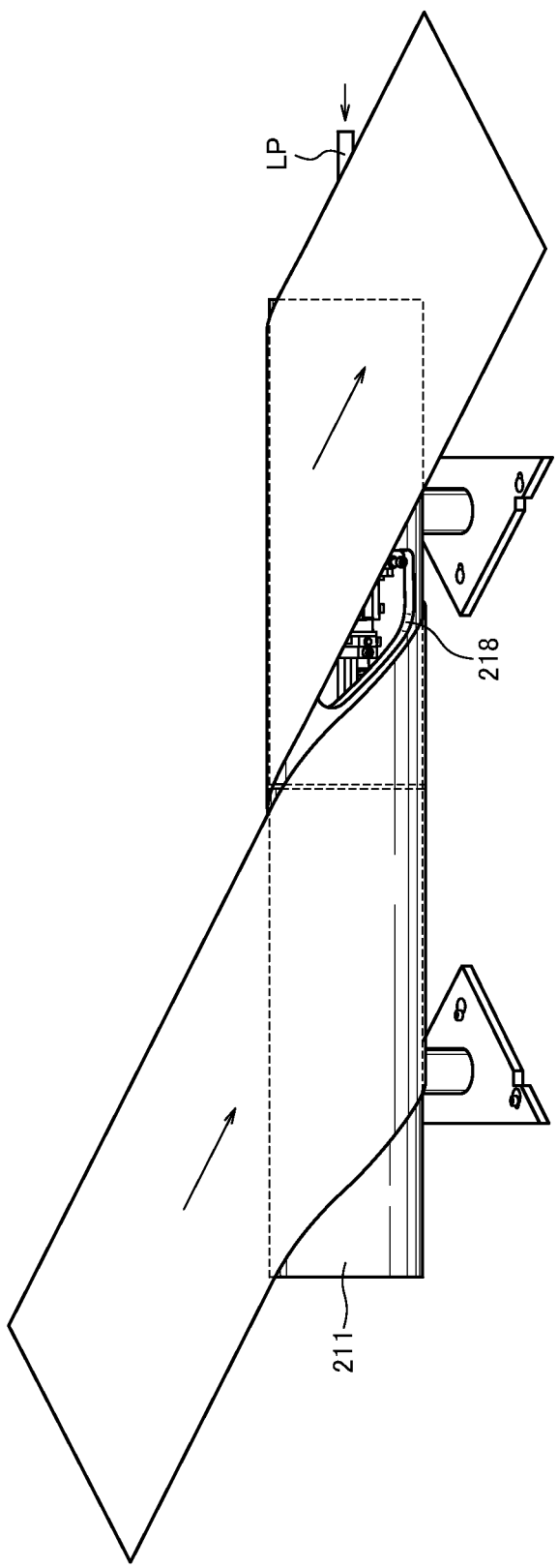
FIG. 7 is a diagram illustrating a relationship between a cylindrical body and a thin plate according to a second example of the present invention.
Figure 8:
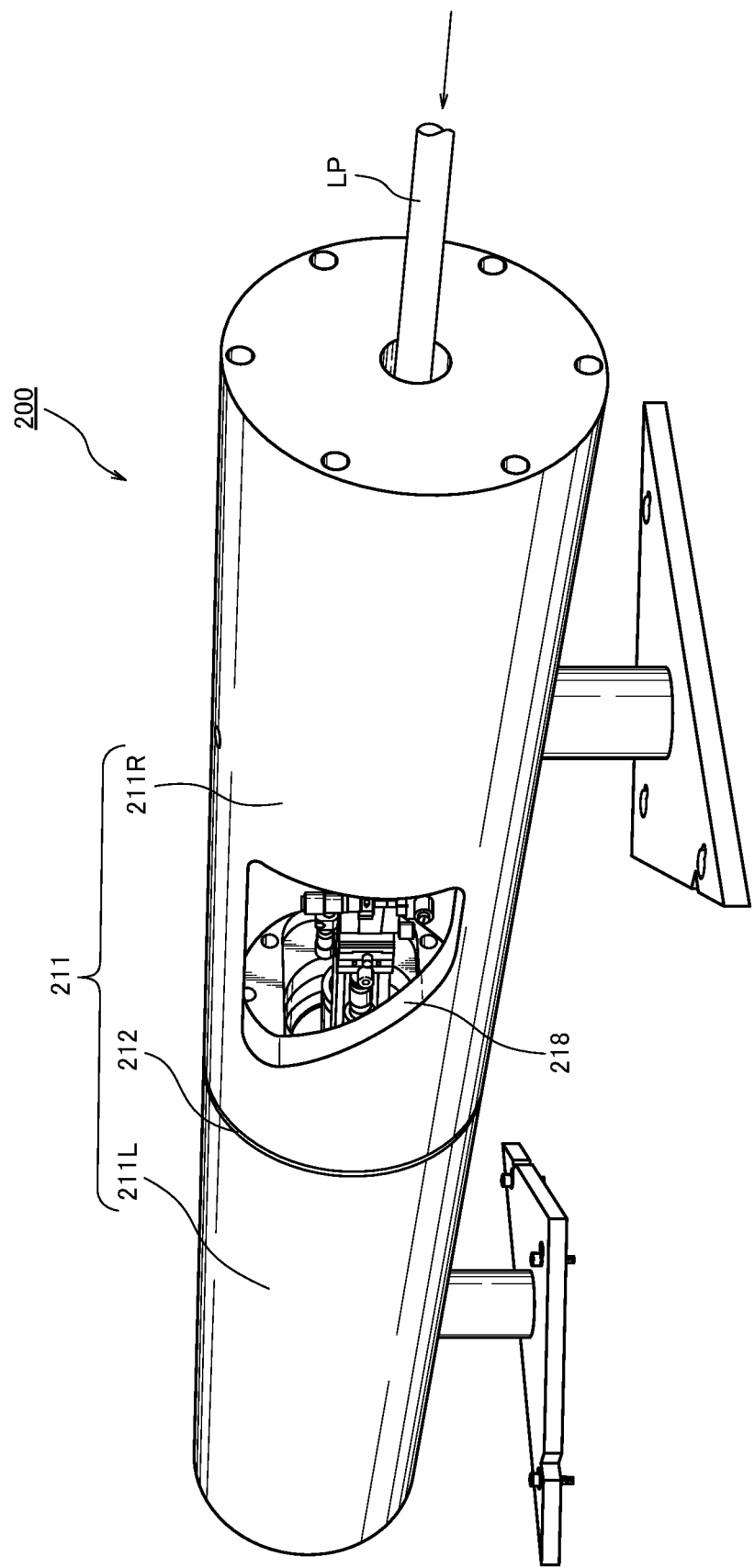
FIG. 8 is a diagram illustrating the appearance of the cylindrical body according to the second example of the present invention.
Figure 9:
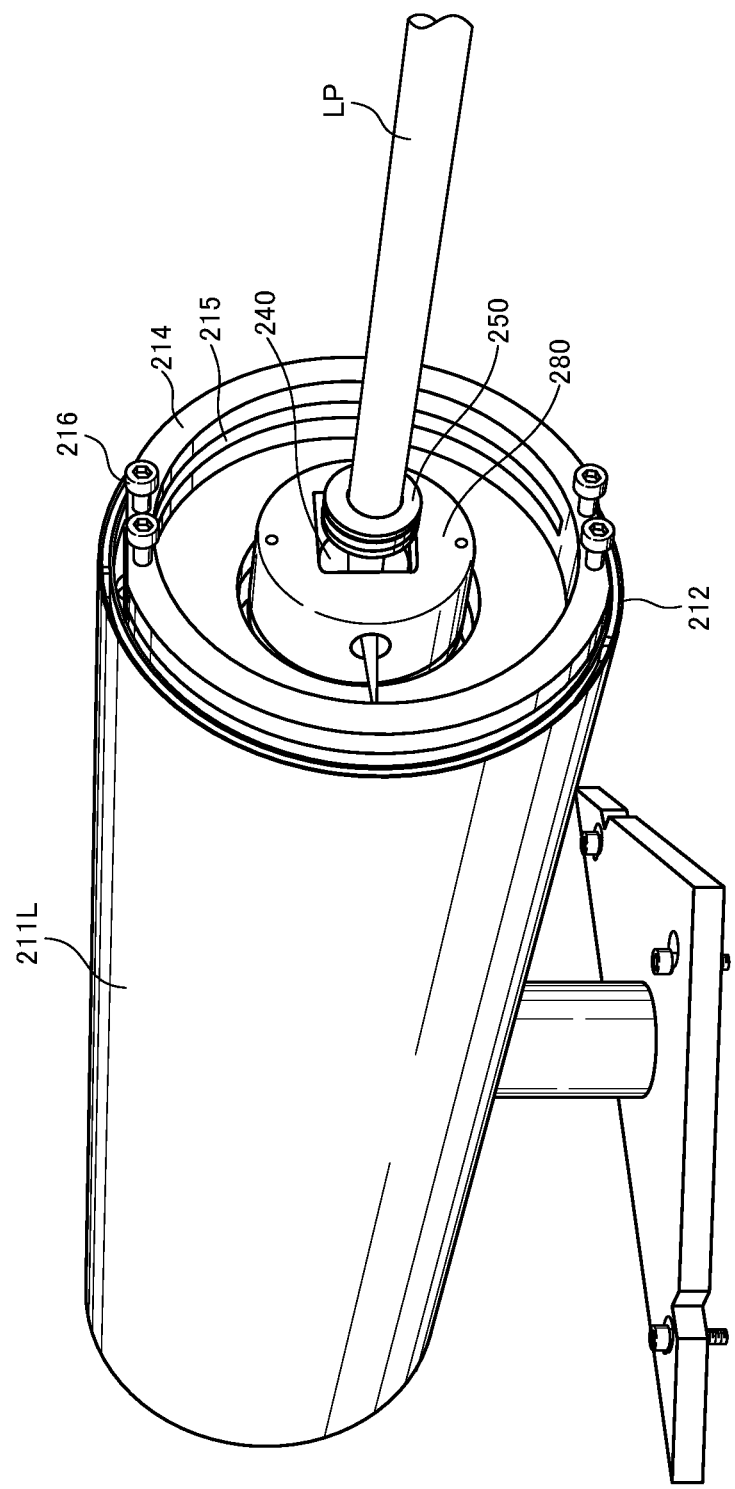
FIG. 9 is a diagram illustrating a configuration of an opening of the cylindrical body according to the second example of the present invention.
Figure 10:
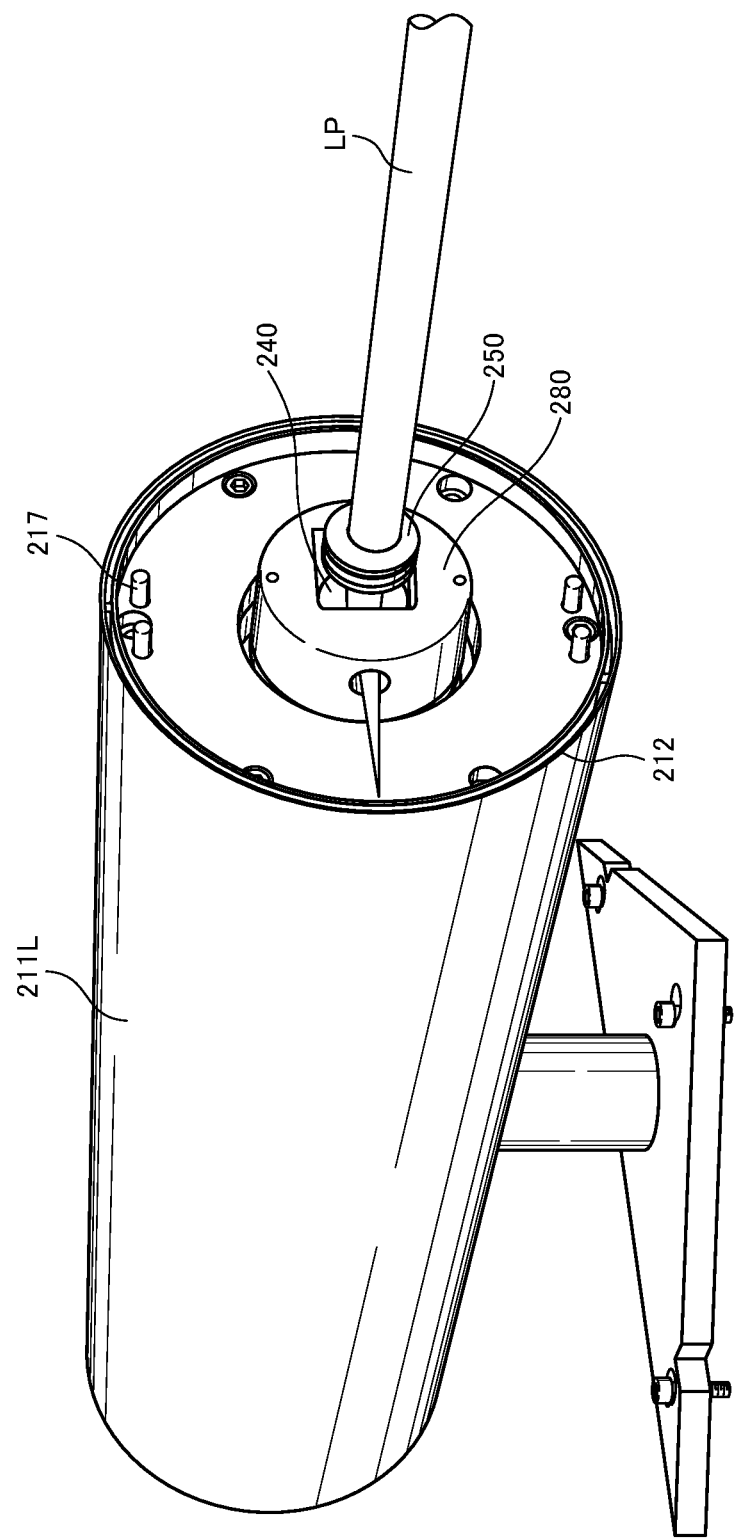
FIG. 10 is a diagram illustrating another configuration of the opening of the cylindrical body according to the second example of the present invention.

Here, FIG. 7 is a diagram illustrating a relationship between a cylindrical body and a thin plate according to a second example of the present invention. FIG. 8 is a diagram illustrating the appearance of the cylindrical body according to the second example of the present invention. FIG. 9 is a diagram illustrating a configuration of an opening of the cylindrical body according to the second example of the present invention. And FIG. 10 is a diagram illustrating another configuration of the opening of the cylindrical body according to the second example of the present invention.

The reference numerals of the 100s attached to the parts in the laser processing apparatus 100 of the first example described above are replaced with the reference numerals of the 200s other than those of a slit attachment 214, an internal slit 215, a drum joining bolt 216, a drum joining pin 217, and an inspection window 218 in the second example of the present invention. In this way, repetitive explanations and illustrations about the same parts as the first example will be omitted.

In case of processing a long thin metal plate TF made of, for example, copper with a laser processing apparatus 200 of the present example, as shown in FIG. 7, the thin plate TF is wound around a feeding reel 221 (not shown). After the thin plate TF is pulled out and wound obliquely around a cylindrical body 211, the thin plate TF is taken up in the longitudinal direction at a constant transfer speed by a taking-up reel 222 (not shown), which is disposed on the side opposite to the feeding reel 221 with respect to the cylindrical body 211.

In the present example, a deviation angle α formed by a central axis 213 and a feed axis 221a is π/4 (rad) as in the first example. However, an angle formed by a taking-up axis 222a of the taking-up reel 222 and the central axis 213 is π-π/4=3π/4. Thus, the feed axis 221a and the taking-up axis 222a are arranged in parallel.

As shown in FIG. 8, the circumferential surface, around which the thin plate TF to be processed is wound, of the cylindrical body 211 has the shape of the outer surface of a column. Thus, the thin plate TF, which is in close contact with the cylindrical body 211, has a cylindrical shape at least in a portion in contact with the cylindrical body 211.

In the present example, the winding angle is set to about 2π (rad), and a circumferential portion is set to 2π (rad) corresponding to the winding angle. As a result, the appearance is substantially cylindrical.

As shown in FIG. 8, the cylindrical body 211 of the present example is formed by joining a cylindrical left drum 211L and a cylindrical right drum 211R having the same diameters. As a result, the cylindrical body 211 as a whole has a long hollow cylindrical appearance.

A slit-shaped opening 212 that is long along the circumferential direction is formed on the portion where the left drum 211L and the right drum 211R are joined, and the thin plate TF is wound around the cylindrical body 211 so as to cover the opening 212.

Further, an inspection window 218 is provided in a portion which is in the cylindrical surface of the right drum 211R of the present example and which is other than the portion where the thin plate TF is wound and in close contact. Since the inside of the cylindrical body 211 can be accessed through the inspection window 218, the optical system and the like can be adjusted while the thin plate TF is under processed and is wound around the cylindrical body 211.

As shown in FIG. 8, a portion where the left drum 211L and the right drum 211R constituting the cylindrical body 211 are joined is the opening 212 over the entire circumference.

The opening 212 is formed in a slit shape that opens around in the circumferential direction of the cylindrical body 211. In the present example, the opening angle of the opening 212 with respect to the central axis 213 is 2π (rad).

As shown in FIG. 9, a reflecting member 240 composed of a 90-degree reflecting mirror is fixed to an optical base 280, and the pulsed light LP incident on the reflecting member 240 is reflected by the reflecting member 240, and the traveling direction is changed in a right angle, in other words the pulsed light LP travels via the reflecting member 240. And then, the pulsed light LP travels in the radial direction of the cylindrical body 111 and is ejected from the opening 212 to the outside of the cylindrical body 211.

The pulsed light LP ejected from the slit-shaped opening 212 over the opening angle 2π irradiates and processes the thin plate TF having a cylindrical shape along the cylindrical body 211.

In the present example, the pulsed light LP incident on the cylindrical body 211 passes through a light condensing means 250 composed of light condensing lens assembly to start condensing light. After passing thorough the light condensing means 250, the pulsed light LP enters the reflecting member 240. The pulsed light LP is reflected by the reflecting member 240 and then condensed on the thin plate TF.

Since the reflecting member 240 is fixed to the optical base 280, and is connected to a rotating shaft 231 of a motor 230 (not shown) via the optical base 280 to be arranged rotatably, the ejection direction of the pulsed light LP, which is reflected by the reflecting member 240, changes in a plane perpendicular to the central axis 213 of the cylindrical body 211 in accordance with the rotation of the reflecting member 240. And then, the pulsed light LP is ejected from the opening 112 so that the pulsed light LP scans the entire circumference in irradiation angle 2π of the pulsed light LP with respect to the rotation axis 230a.

In the present example, in a configuration of joining the left drum 211L and the right drum 211R, a slit attachment 214 is fixed inside the opening 212 of the left drum 211L for joining with the right drum 211R. In the slit attachment 214, two rings having a rectangular cross section are bent in an arc shape, and the upper end portions and the lower end portions thereof are joined to form a ring shape as a whole. Thus, two arc-shaped elongated internal slits 215 are formed on the same circle around the circumferential surface.

Further, two pairs of the drum joining bolts 216 can be fastened to the portions corresponding to two of upper and lower portions where the internal slit 215 is not formed in side surfaces of the slit attachment 214. After the left drum 211L and the right drum 211R are arranged to face each other through the opening 212, the left drum 211L and the right drum 211R can be joined by the drum joining bolt 216 from the inspection window 218.

The number and position of the internal slits 215 of the slit attachment 214 and the number and position of the drum joining bolts 216 can be appropriately set according to the processing mode and purpose.

Since the present example has the above-described configuration, the pulsed light LP after being reflected by the reflecting member 240 first passes through the internal slit 215 and then is ejected from the opening 212 to the outside of the cylindrical body 211 to process a thin plate TF.

In the present example, since the pulsed light LP can be used for processing over the entire circumference, the through hole TH can be formed and processed more efficiently than in the first example.

By the way, depending on the direction of the rotating reflecting member 240, there are two upper and lower portions where the direction, in which the pulsed light LP is ejected, is deviated from the internal slit 215 and the pulsed light LP irradiates the slit attachment 214. At the timing when the irradiation direction coincides with these positions, the laser light emitting means is controlled so as not to emit the pulsed light LP.

In a case where the through hole TH is formed in the copper thin plate TF, which is a long thin metal plate TF, using the laser processing apparatus 200 according to the present example, even if the through hole TH is formed at any position of the opening 212, the light condensing means 250 is firstly adjusted so that the pulsed light LP is condensed at a desired position on the thin plate TF. Thereafter, the motor 230 (not shown) is rotated to rotate the reflecting member 240.

This adjustment operation can be performed by accessing the inside of the cylindrical body 211 through the inspection window 218 while the thin plate TF is wound around the cylindrical body 211.

Next, the copper thin plate TF wound around the feeding reel 221 (not shown) is pulled out, wound obliquely with respect to the cylindrical body 211 around the entire circumference, over 2π (rad), so as to cover the opening 212 (not shown), and further wound around the taking-up reel 222. And then, the rotation periods of the feeding reel 221 and the taking-up reel 222 are controlled to rotate the feeding reel 221 and the taking-up reel 222 so that the feeding speed becomes, for example, 1 m/min.

The pulsed light LP having, for example, a light emission period of 111 kHz and a pulse width of 10 nsec is emitted from the laser light emitting means 260 (not shown), and the pulsed light LP enters an incident window on the right end surface of the cylindrical body 211 via a beam expander 270 (not shown) and passes through the light condensing means 250 to irradiate the reflecting member 240 so that the through hole TH is formed in the thin plate TF with a single pulse irradiation.

At this time, the laser light emitting means 260 is controlled in synchronization with the rotation of the motor 230, and the light emission pause period is set so that the pulsed light LP is emitted only at timings at which the pulsed light LP reflected by the reflecting member 240 passes through the internal slit 215.

By appropriately adjusting and controlling the rotation period of the motor 230, the feeding speed of the thin plate TF, and the setting of the pulsed light LP, for examples 1000 pieces of through holes TH at a pitch of 140 µm can be continuously formed in a diagonal line with respect to the thin plate TF during almost all times corresponding to one rotation of the motor 230. Further, by repeatedly forming a row of through holes TH a plurality of times in the same direction while transferring the thin plate TF, a cooper thin plate TF with a pattern of the through holes TH formed in an equally arranged matrix can be obtained more efficiently than in the first example.

However, since the light emission pause period of the pulsed light LP is set based on the positional relationship between the pulsed light LP and the internal slit 215, the through hole TH is not formed in the thin plate TF in portions which passes through the opening 212 during the light emission pause period. Therefore, in the region where the through holes TH distribute in a matrix, there is a band-shaped region without the through holes TH.

Further, as shown in FIG. 10, as another configuration of joining the left drum 211L and the right drum 211R according to the present example, a drum joining pin 217 can be used more simply without using the slit attachment 214 to define the positions of the joining portions.

In FIG. 10, two pairs of the drum joining pins 217 are disposed at two portions on the upper and lower sides respectively, but the number and positions of the drum joining pins 217 can be appropriately set according to the mode and purpose of the processing.

In the case where the left drum 211L and the right drum 211R are joined using the drum joining pin 217, there are timings at which the pulsed light LP irradiates the drum joining pins 217. At these timings, the laser light emitting means may be controlled so that the pulsed light LP is not emitted.

In the case where the through holes TH are formed on the thin plate TF with this control, in the region where the through holes TH distribute in a matrix, there is a band-shaped region without the through holes TH.

As described above, according to the laser processing apparatus 200 of the present example, a large number of fine through holes TH having a uniform shape and arrangement can be continuously opened in a thin plate TF with suppressed generation of burrs and laser processing can be performed for a thin plate TF with high accuracy and more remarkably improved working efficiency compared to the first example.

Further, according to the laser processing method of the present example, a large number of fine through holes TH having a uniform shape and arrangement can be continuously opened in a thin plate TF with suppressed generation of burrs, and laser processing can be performed for a thin plate TF with high accuracy, more remarkably improved working efficiency compared to the first example and low cost due to suppressed wear of the apparatus.

Furthermore, the thin plate TF of the present example has a large number of fine through holes TH uniformly shaped and arranged, thus the thin plate TF can be a thin copper plate TF excellent in strength and conductivity.

The invention claimed is:

1. A laser processing apparatus comprising:
a cylindrical body having an opening on a circumferential surface around which a thin plate to be processed is wound obliquely, a thin plate transferrer for transferring the thin plate wound around the cylindrical body in the longitudinal direction of the thin plate, a motor having a rotation axis arranged coaxially with a central axis of the cylindrical body, a reflecting member fixed to a rotating shaft of the motor, a laser light emitter for emitting pulsed light,
wherein the apparatus continuously opens a large number of through holes in the thin plate by, while transferring the thin plate in the longitudinal direction, entering the pulsed light from the direction of the rotation axis, reflecting the pulsed light to the radial direction of the cylindrical body by the reflecting member and irradiating the thin plate with the pulsed light through the opening.

2. The laser processing apparatus according to claim 1, wherein the intensity and pulse width of the pulsed light are adjusted so as to open a through hole in the thin plate with a single pulse irradiation.

3. The laser processing apparatus according to claim 1, wherein a light condenser for condensing the pulsed light on a thin plate is disposed between the reflecting member and the thin plate.

4. The laser processing apparatus according to claim 1, wherein a light condenser for condensing the pulsed light on a thin plate is disposed separately between the reflecting member and the thin plate and between the reflecting member and the laser light emitting means.

5. The laser processing apparatus according to claim 1, wherein a light condenser for condensing the pulsed light on a thin plate is disposed between the reflecting member and the laser light emitter.

6. A laser processing method, wherein a large number of through holes are opened continuously in a thin plate, by winding the thin plate to be processed obliquely around a hollow cylindrical body having an opening on a circumferential surface, and by, while transferring the thin plate in the longitudinal direction of the thin plate with a thin plate transferrer, entering pulsed light emitted from a laser light emitter from the direction of a rotation axis of a motor that is arranged coaxially with a central axis of the cylindrical body, reflecting the pulsed light to the radial direction of the cylindrical body by a reflecting member that is fixed to a rotating shaft of the motor, and then irradiating the thin plate with the pulsed light through the opening.

7. The laser processing method according to claim 6, wherein the rotation period of the motor and the transfer speed of the thin plate transferrer are adjusted to be respectively constant.

8. The laser processing method according to claim 6, wherein the light emission timing of pulsed light emitted by the laser light emitter is set in synchronization with the rotation of the motor so as to eject the pulsed light to the opening via the reflecting member.

9. A thin plate with a large number of through holes formed by a laser processing apparatus comprising:
- a cylindrical body having an opening on a circumferential surface around which a thin plate to be processed is wound obliquely, a thin plate transferrer for transferring the thin plate wound around the cylindrical body in the longitudinal direction of the thin plate, a motor having a rotation axis arranged coaxially with a central axis of the cylindrical body, a reflecting member fixed to a rotating shaft of the motor, a laser light emitter for emitting pulsed light,
- wherein the apparatus continuously opens a large number of through holes in the thin plate by, while transferring the thin plate in the longitudinal direction, entering the pulsed light from the direction of the rotation axis, reflecting the pulsed light to the radial direction of the cylindrical body by the reflecting member and irradiating the thin plate with the pulsed light through the opening.

10. The thin plate according to claim 9, wherein the thin plate is made of metal.

* * * * *